United States Patent
Szwaykowski et al.

(10) Patent No.: US 8,004,687 B2
(45) Date of Patent: Aug. 23, 2011

(54) INTERFEROMETRIC SYSTEM WITH REDUCED VIBRATION SENSITIVITY AND RELATED METHOD

(75) Inventors: Piotr Szwaykowski, Glendale, CA (US); Federick N. Bushroe, Tucson, AZ (US); Raymond J. Castonguay, Tucson, AZ (US)

(73) Assignee: Trology, LLC, Tucson, AZ (US)

( * ) Notice: Subject to any disclaimer, the term of this patent is extended or adjusted under 35 U.S.C. 154(b) by 307 days.

(21) Appl. No.: 10/536,576

(22) PCT Filed: Nov. 26, 2003

(86) PCT No.: PCT/US03/38005
§ 371 (c)(1),
(2), (4) Date: Feb. 6, 2006

(87) PCT Pub. No.: WO2004/051183
PCT Pub. Date: Jun. 17, 2004

(65) Prior Publication Data
US 2006/0146341 A1    Jul. 6, 2006

Related U.S. Application Data

(60) Provisional application No. 60/429,669, filed on Nov. 27, 2002, provisional application No. 60/459,149, filed on Mar. 31, 2003.

(51) Int. Cl.
*G01B 9/02*    (2006.01)
(52) U.S. Cl. ..................................... 356/495
(58) Field of Classification Search .......... 356/492–495, 356/511–513
See application file for complete search history.

(56) References Cited

U.S. PATENT DOCUMENTS

| | | | |
|---|---|---|---|
| 3,950,103 A | 4/1976 | Schmidt | |
| 3,958,884 A * | 5/1976 | Smith | 356/495 |
| 4,583,855 A | 4/1986 | Bareket | 356/351 |
| 4,732,483 A * | 3/1988 | Biegen | 356/495 |
| 4,872,755 A * | 10/1989 | Kuchel | 356/495 |
| 5,491,552 A * | 2/1996 | Knuttel | 356/495 |
| 5,995,223 A * | 11/1999 | Power | 356/495 |
| 6,128,080 A | 10/2000 | Janik et al. | |
| 6,304,330 B1 | 10/2001 | Millerd et al. | 356/521 |
| 6,341,015 B2 * | 1/2002 | Shirley | 356/517 |
| 6,552,808 B2 | 4/2003 | Millerd et al. | 356/521 |
| 6,690,474 B1 * | 2/2004 | Shirley | 356/603 |
| 2003/0095264 A1 | 5/2003 | Ruchet | 356/491 |

FOREIGN PATENT DOCUMENTS

| | | |
|---|---|---|
| DE | 196 52 113 | 6/1998 |
| WO | WO 2004/051182 | 6/2004 |

OTHER PUBLICATIONS

Hettwer, et al., "Three Channel Phase-Shifting Interferometer Using Polarization-Optics and a Diffraction Grating", The International Society for Optical Engineering, Optical Engineering, vol. 39, pp. 960-966, Apr. 2000 (abstract only).
Nakadate et al., "Real-Time Fringe Patter Processing and its Applications", Proc. of SPIE, vol. 2544, pp. 74-86, Jun. 1995 (abstract only).
Sivakumar, et al., "Large Surface Profile Measurement with Instantaneous Phase-Shifting Interferometry", Optical Engineering, Feb. 2003, vol. 42, Issue 2, pp. 367-372 (abstract only).
Koliopoulos, Chris L., "Simultaneous Phase-Shift Interferometer", Proceedings of SPIE, vol. 1531, Advanced Optical Manufacturing and Testing II, 1992, pp. 119-127.

* cited by examiner

*Primary Examiner* — Hwa Lee
(74) *Attorney, Agent, or Firm* — Hayes Soloway P.C.

(57) ABSTRACT

A source module (12) generates mutually orthogonally polarized beams of light as emanating from two spatially separated point sources (Sv, Sw) for use in a phase shifting interferometer.

39 Claims, 4 Drawing Sheets

INTERFEROMETRIC SYSTEM WITH REDUCED VIBRATION SENSITIVITY AND RELATED METHOD

CROSS-REFERENCE TO RELATED APPLICATION(S)

This application is a National Phase Patent Application of International Application Number PCT/US03/38005, filed on Nov. 26, 2003, which claims priority of U.S. Provisional Application Ser. No. 60/459,149, filed Mar. 31, 2003, and U.S. Provisional Application Ser. No. 60/429,669, filed Nov. 27, 2002.

FIELD OF THE INVENTION

The instant invention is directed to an interferometric system and method, in particular, an interferometric system and related method for enabling measurements of a wavefront in the presence of vibration or other disturbances that impede accurate measurements.

BACKGROUND OF INVENTION

Interferometers have been known and used for a long time. They are used for many purposes, including measuring characteristics of gases, liquids, and materials, through the use of transmitted or reflected light. There exist many types of interferometers that are classified by their optical design. A few of the most widely used interferometer types include Fizeau, Twyman-Green, Michaelson, and Mach-Zender. Each of these optical designs produces interference patterns called interferograms which are generated by the optical interference of test and reference wavefronts. In a typical interferometer, test and reference beams are obtained by appropriately splitting an incoming source beam ("beams" and "wavefronts" used interchangeably herein, with a "wavefront" being understood by one of ordinary skill in the art as propagating along the optical axis and sweeping out a volume that defines the light beam). One of the beams interacts with an object under test (hence commonly referred to as the "test beam") thus carrying information about the test object being measured, while the other interacts with a known reference object (hence, commonly referred to as the "reference beam"). Interfering or otherwise coherently superimposing these two wavefronts produces an interferogram.

Information about a measured object can be extracted from a single interferogram. This technique allows for fast data acquisition, however, it typically suffers from poor spatial resolution, time consuming and complex data processing and/or non-uniform data sampling. Thus, it is often desirable to use other techniques instead. The most common techniques use three or more phase-shifted interferograms (typically three to twelve). Using multiple phase-shifted interferograms provides additional information that can be used to greatly increase the accuracy of the analysis.

Phase-shifting is a method used to change the phase between the test and reference wavefronts in a controllable way. During the last 20 years, various methods have been used to practically implement phase shifting techniques, including mechanically moving the reference object small distances comparable to the wavelength of light, or placing photo-elastic modulators and crystal retarders in the beam path. Almost all of these methods use a sequential approach (serial in time) to generate phase-shifted interferograms, which is accomplished by introducing prescribed changes to the wavefront phase while a detector acquires a series of data images. For example, the sequence of acquiring temporal phase-shifted interferograms occurs as follows: acquire interferogram, then shift the phase, acquire interferogram, then shift the phase, and so on. However, these known time-dependent methods are sensitive to environmental conditions during the span of time in which series of interferograms are acquired. Environmental conditions that can introduce errors include vibration, airflow, temperature changes, object movements, etc. Vibration is usually the major cause of error. Elaborate mounts or expensive vibration isolation tables are commonly used to isolate temporal phase-shifted interferometers from the physical environment.

To enable interferometric measurements under normal environmental conditions, without special isolation equipment, instruments have been developed to acquire multiple phase-shifted interferograms simultaneously. This eliminates or greatly reduces the effect of these errors on measurements. However, such simultaneous phase shifting methods have to date been limited to particular types of interferometers, such as the Twyman-Green or Mach-Zender types discussed below.

U.S. Pat. No. 4,583,855 (issued to Barekat) entitled "Optical Phase Measuring Apparatus" relates to use of a polarization type Twyman-Green interferometer with quarter-waveplates and polarizers. ("Quarter-waveplates" and "half-waveplates" used herein are understood by one of ordinary skill in the art as equivalent to quarter-wave retarders and half-wave retarders, respectively). Koliopulos in a paper entitled "Simultaneous Phase Shift Interferometer", Proc. SPIE Vol. 1531, p. 119 (1992), described the use of a polarization type Twyman-Green interferometer. A. Hettwer, J. Krantz and J. Schwider in a paper titled "Three Channel Phase-Shifting Interferometer Using Polarization Optics and A Diffraction Grating" Opt. Eng., 39(4) (April 2000) described a Twyman-Green interferometer. German Patent DE 196,52,113, A1 awarded to J. Schwider discloses the invention that is described in his above-cited paper, based on a Twyman-Green interferometer. U.S. Pat. No. 6,304,330 entitled "Method and Apparatus for Splitting, Imaging and Measuring Wavefronts in Interferometry" and U.S. Pat. No. 6,552,808 are directed to a modified polarization type Mach-Zender and Twyman-Green interferometers.

As intimated above, optical interferometers are typically constructed of optical components such as lenses, mirrors, beamsplitters, and waveplates. These components usually have slight imperfections or deviations from an ideal perfect component. From a practical standpoint, Twyman-Green type interferometers can suffer from a configuration having a reference arm and a test arm that are of separate paths. Because the interferogram generated by the interferometer is an image or pattern that registers differences between the test and reference wavefront, a separation of the test and reference path such as in a Twyman-Green type interferometer, can cause imperfections and aberrations in the optical components encountered in one path, but not in the other path, to register as measurement errors. That is, where the beam paths are separate, an error in one path not present in the other path can register in the final comparison result (the interferogram). Because the aforementioned interferometers have Twyman Green type configurations, they are susceptible to the disadvantages of separate paths between the test and reference beams.

A well recognized advantage of a Fizeau interferometer is the feature of a common path shared by the test and reference wavefronts throughout most of the interferometer. Where the test and reference wavefronts both travel through the same optical components, imperfections and aberrations in components are common to both wavefronts, and do not register as measurement errors in the interferogram. Thus imperfect components do not impart "difference errors" in the final comparison of the test object to the reference object. As such, the Fizeau configuration is significantly more tolerant and robust compared to other interferometry systems. Imperfect components in its construction have little or no effect on the accuracy and precision of the final measurement results. This and other typical features of the Fizeau, including an alignment mode, ability to measure large flat optics, zoom capabilities, and ease of use with corrective null optics, have made the Fizeau a very popular, if not the most popular, interferometer configuration for practical applications.

However, despite such advantages of the Fizeau-type interferometers, there has been little, if any, ability or method known to construct or use a Fizeau interferometer that is capable of simultaneous phase-shifting.

Accordingly, there is a desire for a Fizeau-type interferometer capable of simultaneous phase shifting, and, further, for a simultaneous phase shifting Fizeau-type interferometer that uses orthogonally polarized beams.

SUMMARY OF THE INVENTION

The instant invention is directed to an interferometric system having a source module, an interferometry module and a simultaneous phase shifting module. In particular, the source module generates mutually orthogonally polarized beams of light that are received by the interferometry module for interaction with a reference object and a test object. The interferometry module is configured with various optical elements that define a common beam pathway so as to minimize the introduction of measurement errors. Test and reference beams exiting the interferometry module then enter the simultaneous phase shifting module where at least two phase shifted interferograms are generated substantially simultaneously.

More specifically, the present invention is directed to an interferometric system, having a source module with a source of polarized light, a polarization beamsplitter element configured to act on the polarized light to generate mutually orthogonally polarized beams of light, an interferometry module that includes a mechanism for overlapping a test beam and a reference beam, and a phase shifting module that generates at least two phase-shifted interferograms substantially simultaneously from overlapping test and reference beams.

The present invention may further provide a source module having a polarization beamsplitter element configured to generate mutually orthogonally polarized beams as emanating from two spatially separated point sources (either real or virtual). The present invention also contemplates an interferometry module having a test object and a reference, a beam splitter and a collimator, where the beamsplitter and the collimator define a substantially common path for the two orthogonally polarized beams, and the mechanism for overlapping permits a selection of a specific pair of mutually orthogonally polarized reference and test beams for processing by the simultaneous phase-shifting module.

The present invention specifically contemplates an interferometric system with a Fizeau or Fizeau-type front end assembly that processes orthogonally polarized test and reference wavefronts for input to a simultaneous phase-shifting module for purposes of generating two or more phase-shifted interferograms, where the phase shifting may be accomplished by a variety of simultaneous phase shifting methods. The simultaneous acquisition of multiple wavefronts results in robust measurements in the presence of vibration and other environmental conditions.

The foregoing and other objects, features and advantages of the invention will be apparent from the following more particular description of the preferred embodiments, taken in conjunction with the accompanying drawings, which illustrate, by way of example, the principles of the invention.

DESCRIPTION OF THE INVENTION

Figures 1, 3A, 3B:
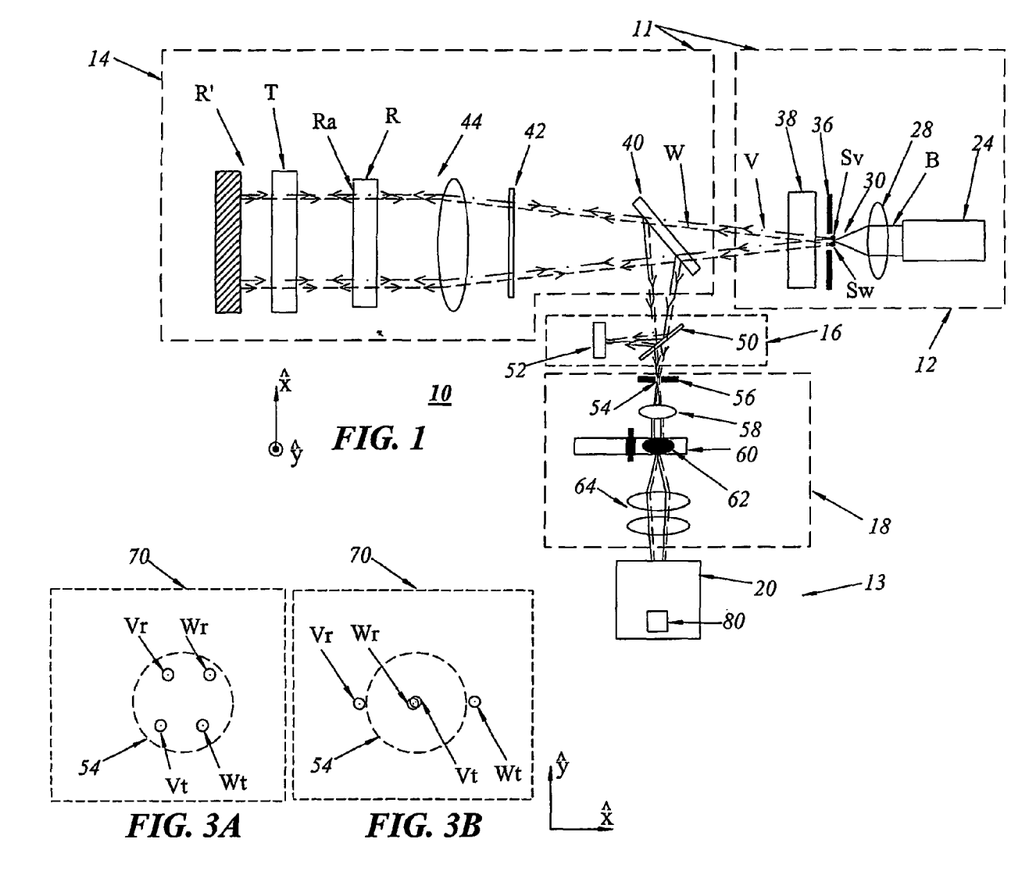
FIG. 1 is a plan view of an embodiment of the present invention using a polarization beamsplitter element.
FIGS. 3A and 3B are plan views of an image displayed on an alignment camera of the invention of FIG. 1, showing, respectively, wavefronts without overlap before alignment, and wavefronts with overlap after alignment.

An interferometric system 10 of the present invention is shown in FIG. 1. The illustrated embodiment of the system 10 has, in optics parlance, a front end or front end assembly 11 and a back end or back end assembly 13. The front end 11 includes at least a source or source module 12 and an interferometry module 14. The back end 13 includes at least a simultaneous (or substantially simultaneous) phase-shifting module 20 for generating multiple phase-shifted interferograms suitable for a wide variety of applications in many different fields. Some examples include, without limitation, generating 3-D surface profiles, computing aberrations for tested optical systems, distribution of velocity of a gas flow chamber and distribution of refractive index within optical materials. The embodiment of the back end 13 shown in FIG. 1 also includes an alignment module 16 and an imaging system 18. In accordance with the present invention, the source 12 is configured to generate mutually orthogonally polarized beams that enter the interferometry module 14 for purposes of interacting with a test optic or object (and a reference optic or object) whose characteristics are to be acquired. That is, the characteristics of the test and reference object are imparted, respectively, to test beams and reference beams emerging from the interferometry module 14. Advantageously, the interferometry module 14 is configured as a Fizeau or a Fizeau-type characterized by a substantially common optical path for both reference and test beams, between at least the non-polarizing beamsplitter 40 and reference surface Ra.

In the embodiment of FIG. 1, the reference and test beams emerging from the interferometry module 14 encounter the alignment module 16 and the imaging system 18 before entering the phase shifting module 20, which is preferably a simultaneous phase shifting module, such as the module that is subject of a co-pending application entitled "SIMULTANEOUS PHASE SHIFTING MODULE FOR USE IN INTERFEROMETRY," the contents of which are incorporated herein by reference. However, it is understood by one of ordinary skill in the art that any simultaneous phase shifting module capable of processing mutually orthogonally polarized beams may be used with the present invention. In accordance with the present invention, measurement results are complied from two or more (preferably three to six) interferograms obtained simultaneously by the module 20.

The embodiment of the source 12 as shown in FIG. 1 has a polarized source 24 generating a beam of linearly polarized light (or wavefront) B that passes through a lens 28 which focuses the light through an aperture or pinhole 30 configured in a spatial filter 36. The wavefront B then travels through polarization beamsplitter element 38 which generates (or otherwise splits the wavefront B into) two mutually orthogonally polarized wavefronts V and W. The optical element 38 which operates as a polarization beamsplitter on the light beam B to produce the mutually orthogonally polarized wavefronts V and W can assume a number of different configurations and/or embodiments not limited to those discussed in detail further below.

In accordance with the present invention, the two mutually orthogonally polarized wavefronts V and W exiting the polarization beamsplitter element 38 are displaced with respect to each other as if they originated from two slightly spatially separated (virtual or real) sources Sv and Sw, respectively. With respect to the embodiment of FIG. 1 and for ease of discussion, the sources Sv and Sw are horizontally displaced from each other. That is, using the Cartesian coordinate system X-Y shown in FIG. 1, where the X axis is in the plane of the drawing and the Y axis is perpendicular out of the plane, the sources Sv and Sw have the same Y coordinate, but have different X coordinates.

Entering the interferometry module 14, the two wavefronts V and W (mutually orthogonally polarized and emanating from spatially separated sources Sv and Sw, respectively) travel through various optics, including a non-polarizing beamsplitter 40, a quarter waveplate 42, a collimator 44 (whose focal plane defines the location of the virtual sources Sv and Sw), before they encounter a reference or known object R. There, a percentage of each of the two wavefronts V and W reflects off a surface Ra of the reference object R, while another percentage of the wavefronts V and W travels (to the left) toward a test object T. The percentage reflected off the surface Ra forms reference wavefronts Vr and Wr which (traveling to the right in FIG. 1) transmit back through the collimator 44 and the quarter waveplate 42 and reflect off the non-polarizing beamsplitter 40 to exit the interferometry module 14. As such, the reference wavefronts Vr and Wr now carry characteristics or information about the reference surface Ra which were imparted to these wavefronts as they reflected off or otherwise interacted with the reference surface.

The other percentage of the two wavefronts V and W that transmitted completely through the reference object R continues to travel toward the test object T (to the left in FIG. 1). A reflection off the test object T forms test wavefronts Vt and Wt (traveling to the right in FIG. 1) which then return through the reference object R, the collimator 44 and the quarter waveplate 42 before reflecting off the non-polarizing beamsplitter 40 to exit the interferometry module 14. The test wavefronts Vt and Wt now carry characteristics or information about the test object T which were imparted to these wavefronts as they reflected off or otherwise interacted with the test object T. It is understood by one of ordinary skill in the art that depending on the optical properties of the test object T, wavefronts incidental on the test object T can also can transmit through the test object T and reflect off a second reference object R' (to create Vt' and Wt', not shown). In the latter event, the wavefronts Vt' and Wt' are treated by the system 10 in a fashion similar to that described herein for the wavefronts Vt and Wt.

It is understood by one of ordinary skill in the art that the collimator 44 can be obviated from the module 14 where the reference object R is configured with appropriate surface curvature to direct or focus the wavefronts Vt, Wt (or Vt' or Wt') back along the same path traveled by the wavefronts V and W entering the object R. It is further understood by one of ordinary skill in the art that the quarter waveplate 42 is an optional component of the interferometry module 14 and is commonly used to produce circularly polarized light which is often preferred for measurements.

In the embodiment of FIG. 1, a portion of the four wavefronts Vr, Wr, Vt and Wt exiting the interferometry module 14 are diverted to the alignment module 16, by reflection off a mirror 50 toward an alignment camera 52. The mirror 50 is positioned or flipped out of the beam path when the system 10 is operating in the measurement mode, and positioned or flipped back in the beam path during the alignment mode. It is understood by one of ordinary skill in the art that the alignment module 16 is provided primarily for the user's convenience and is not a necessary component of the present invention for purposes of generating effective interferograms. When used, the alignment camera 52 is positioned at the focal point of the portion of the wavefronts Vr, Wr, Vt and Wt reflected off the mirror 50 so that each of these reflected portions of the wavefronts forms a localized image or spot on an image sensor of the camera 52.

As shown in FIG. 3A, an image 70 of the camera 52 displays a plurality of four localized images or spots, each of which corresponds to one of the wavefronts Vr, Wr, Vt and Wt. The relative positioning and plurality of the spots, namely four, are due to the spatial separation between the sources Sv and Sw, the angular tilt position of the reference object R and the test object T (or the reference object R', as the case may be). In particular, the x displacement between the dots of the wavefronts Vr and Wr (or Vt and Wt) corresponds with the x displacement between the virtual sources Sv and Sw (see FIG. 1) and the displacement along the y axis between the dots of the wavefronts Vr and Vt (or Wr and Wt) corresponds to the relative tilt orientation of (or angle between) the reference object R and the test object T (or the reference object R', as the case may be).

In order to generate an interferogram purposeful for revealing information about the test object T, a test wavefront is to at least overlap a reference wavefront. Consequently, orthogonally polarized wavefronts are to overlap sufficiently at the input of the simultaneous phase-shifting module 20, in order for simultaneous phase-shifted interferograms to be generated. Accordingly, of the four polarized wavefront spots, either the orthogonal pair Vr and Wt are to overlap, or the orthogonal pair Wr and Vt are to overlap. To that end, the alignment camera 52 provides the user with a view of the relative positioning of the four wavefronts and any visible degree of overlap between them.

In the situation shown in FIG. 3A, the four spots of the wavefronts Vr, Wr, Vt and Wt of image 70 are without any visible degree of overlap. In that regard, the reference object R and the test object T are mounted on tip-tilt mechanisms, as understood by one of ordinary skill in the art, to enable the user to adjust the relative positioning or orientation angle of the objects R and T so as to manipulate the four spots into an overlapping position or relationship on the image 70. By tipping and/or tilting either the reference object R or the test object T, the user can move and reposition the spots so that the pair of the wavefronts Wr and Vt are superimposed, or that the pair of the wavefronts Wt and Vr are superimposed.

As shown in the FIG. 3B, the user has adjusted the tip-tilt mechanisms of the interferometry module 14 such that the image 70 indicates an overlap between the spots of the wavefronts Wr and Vt. The remaining two spots Vr and Wt in FIG. 3B are separated, and their spacing is such that they will not pass through the aperture hole 54 in the spatial filter 56. The spatial separation of Sv and Sw and the size of the aperture hole 54 are selected such that when two orthogonal spot pairs (either Wr and Vt, or Wt and Vr) are overlapped, the remaining two spots are blocked by the spatial filter 56. If these blocked wavefronts were allowed to pass the spatial filter 56, they would contribute undesirable coherent background light in the module 20, resulting in noise in the final measurement result. (The size of the aperture hole 54, and the spatial separation of Sv and Sw can be constructed to be adjustable, so they can be varied for special applications.)

The wavefronts Wr and Vt are now appropriately positioned relative to each other as shown in FIG. 3B. Portions of the four wavefronts Vr, Wr, Vt and Wt have bypassed the mirror 50, and proceeded to enter the imaging system 18. Wavefronts Vr and Wt are blocked by the spatial filter 56 (see FIG. 3B). The two overlapped wavefronts Wr and Vt pass through the aperture hole 54 of the spatial filter 56, and transmit through collimator 58, before encountering a diffuser 60. It is understood by one of ordinary skill in the art that the user could have selected the alternative the pair of the spots Vr and Wt by operating the tip-tilt mechanisms accordingly.

Because the diffuser 60 maintains the polarization, the overlapped orthogonal wavefronts Wr and Vt, which form a disc of light 62 on the diffuser, will remain orthogonally polarized as they propagate beyond the diffuser 60. It is understood by one of ordinary skill in the art that the diffuser 60 is optional and that it is used to reduce speckle in the resulting interferograms. That is, the diffuser 60 can be desirable, but is not a necessary component of the present invention for the purpose of simultaneously sets of phase-shifted interferograms. In any case, the wavefronts Wr and Vt forming the disc of light 62 on the diffuser 60 are then imaged or otherwise relayed by lenses 64 (e.g., zoom lenses) to the simultaneous phase-shifting apparatus 20, with their mutually orthogonal polarizations maintained in the state they were in on the surface of the diffuser 60. The wavefronts Wr and Vt can now be manipulated and processed by the module 20 to interfere and produce interferograms, of which two or more (preferably three to six) phase-shifted interferograms may be produced substantially simultaneously and used for final analysis.

Figure 2A:
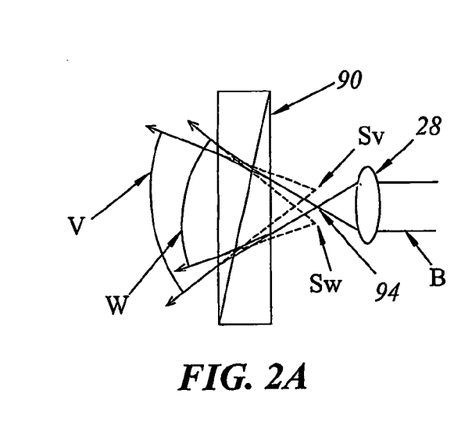
FIGS. 2A-2J are plan views of different embodiments of the polarization beamsplitter element of FIG. 1.
Figure 2B:
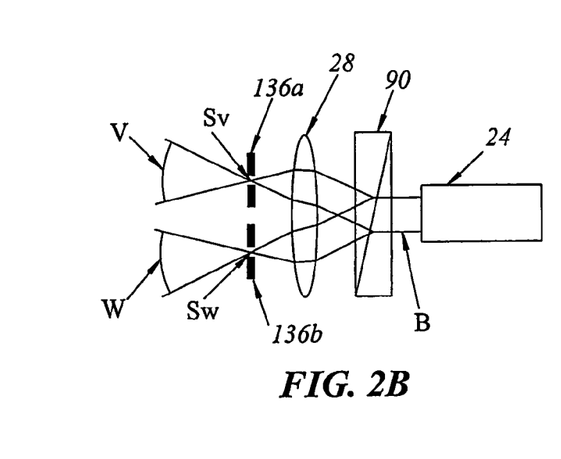
Figure 2C:
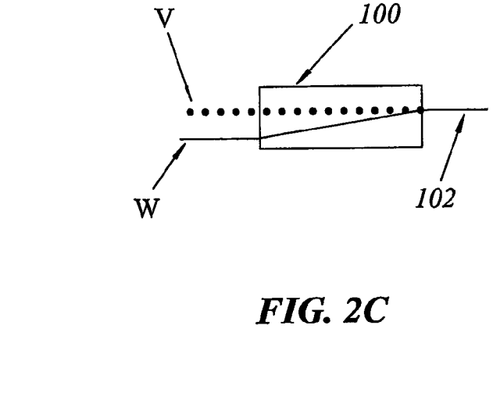
Figure 2D:
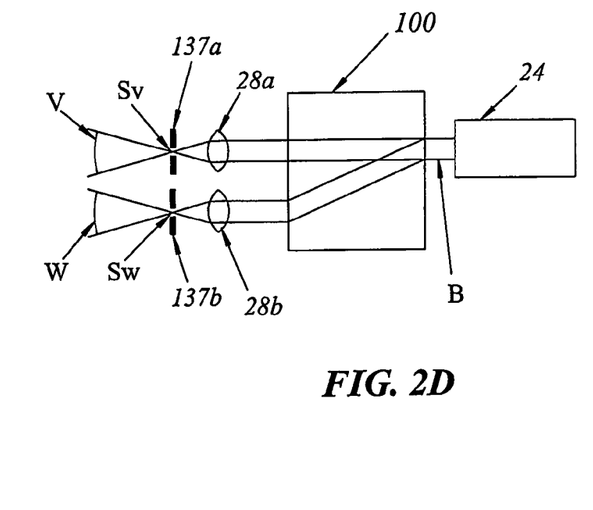
Figure 2E:
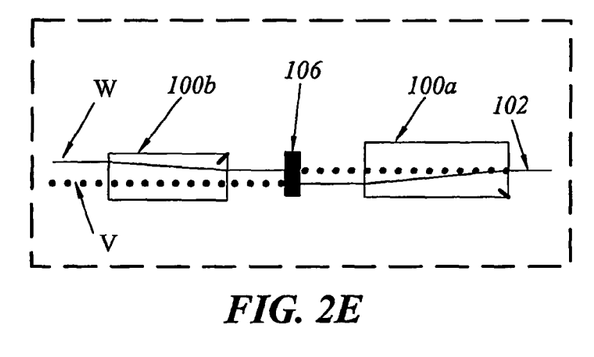
Figure 2F:
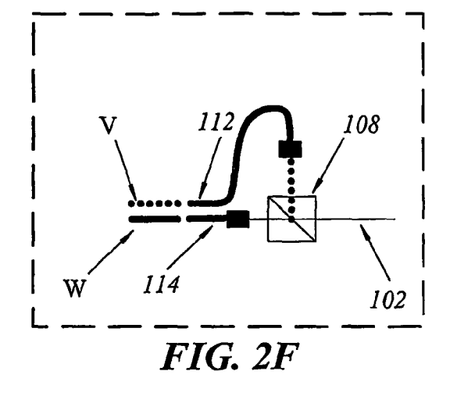
Figure 2G:
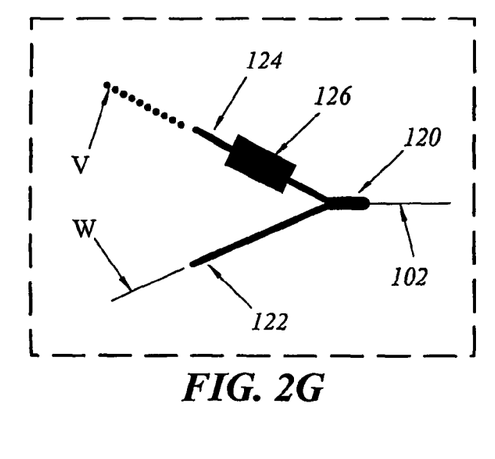
Figure 2H:
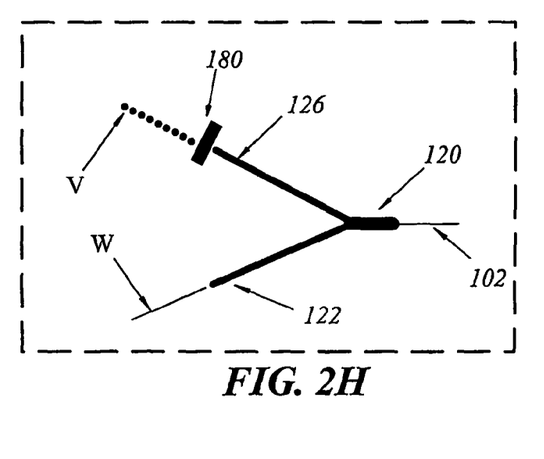
Figure 2I:
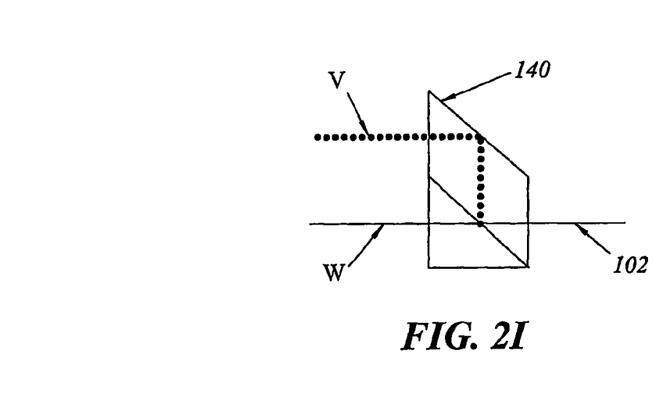
Figure 2J:
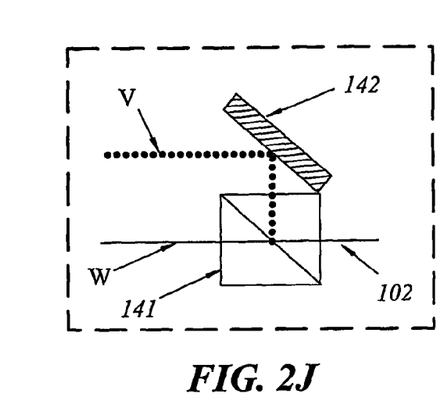

FIGS. 2A-2J show various examples of embodiments of the polarization beamsplitter element 38 of the source 12. In particular, FIGS. 2A and 2B illustrates a Wollaston prism. FIGS. 2C and 2D illustrate a single calcite beam displacer. FIG. 2E illustrates dual calcite beam displacers with a half waveplate. FIG. 2F illustrates dual fiber optics. FIGS. 2G and 2H illustrate a fiber optic splitter. FIG. 2I illustrates a polarizing lateral displacement beamsplitter and FIG. 2J illustrates a polarizing cube beamsplitter and mirror.

In accordance with an aspect of the present invention, the polarization type beamsplitter element 38 functions to produce the two mutually orthogonally polarized beams V and W, and further to produce such beams as originating from spatially separated sources (virtual or real). As understood by one of ordinary skill in the art, the possible embodiments of the polarization beamsplitter element 38 with the aforementioned functions is not limited to the embodiments discussed in detail below.

Referring to FIG. 2A, a prism 90 of the Wollaston type is shown positioned after the focusing lens 28 (and after the spatial filter 36 shown in FIG. 1, but not show here). The focusing lens 28 focuses incoming polarized light B (from a source, not shown) to its focal point 94 from which the light diverges and enters the prism 90 which is positioned beyond the focal point 94. The prism 90 acts on the polarized light and splits it into two orthogonally linearly polarized beams V and W that are angularly displaced with respect to each other by a small angle, thereby creating the virtual sources Sv and Sw. This angle is defined by the geometry of the prism 90 and its birefringent material from which it is made. By specifying the type of material and geometry of the prism, it is possible, as understood by one of ordinary skill in the art, to control the separation of the virtual sources Sv and Sw in the focal plane of the collimator 44 (FIG. 1). This embodiment is desirable for its simplicity, but the use of a diverging beam incidental on the prism may introduce aberrations including astigmatism that normally should not be present in the illuminating beams V and W, because it would typically affect the measurements results. These aberrations can be compensated for with optics (or calibrated out of the measurements) as understood by one of ordinary skill in the art.

Referring to FIG. 2B, the prism 90 of this embodiment is positioned in the collimated beam B after the source 24. To eliminate astigmatism from the illuminating beams V and W, which can arise from the prism 90 as discussed above, the prism 90 is placed in the polarized collimated beam before the focusing element 28. The narrow collimated beam after passing through the Wollaston prism 90 becomes two orthogonally polarized collimated beams that are angularly displaced with respect to each other by a small angle which is defined by the geometry of the prism and properties of the birefringent material from which the prism is made. After passing through the prism 90, the two angularly separated beams pass through the focusing lens 28, and are focused to two separate points Sv and Sw. The separation distance between the points is determined by the angular separation of the beams in the prism 90 and the focal length of the focusing lens 28. With this configuration, the resulting beams V and W are generally free from astigmatism. Moreover, the prism 90 can be of a relatively smaller size since it is used with a collimated beam, and the direction and divergence of the two beams can be better controlled. However, if the beams are to be spatially filtered, two spatial filter pinholes 136 and 136b are used along with the associated mechanisms for placement and adjustment of two pinholes in the focal plane of the focusing lens 28. Furthermore, better optical aberration correction of the focusing lens 28 may be appropriate due to the difference in incident angle of the illuminating beams on lens 28.

The embodiment of FIG. 2C uses a calcite beam displacer 100 positioned after the focusing lens 28. The calcite beam displacer 100 is a single block of calcite (or other birefringent material with similar beam displacing effect), cut with the proper orientation of its fast axis. The beam displacer 100 is placed after the focal plane of the focusing lens 28 and pinhole 30. The calcite block 100 separates properly oriented linearly polarized diverging beam 102 into two orthogonally polarized wavefronts V and W (dotted ray tracing representing the optical axis of the diverging beam with a polarization vector perpendicular to the plane of the drawing and solid ray tracing representing the optical axis of the diverging beam with a polarization vector parallel with the plane of the drawing) that are laterally displaced from each other. The two beams after passing through the calcite block 100 create two virtual sources Sv and Sw in the focal plane of the collimator 44 (see FIG. 1). The separation between the sources is a function of the designed length of the calcite crystal 100. However, the diverging beam 102 upon passing through the calcite crystal 100 acquires astigmatism that typically affects the measurement results. Again, as understood by one of ordinary skill in the art, these aberrations can be compensated for with optics (or calibrated out of the measurements).

Referring to FIG. 2D, the calcite beam displacer 100 of this embodiment is placed in the collimated beam after the source 24. That is, in order to eliminate astigmatism from the illuminating beams V and W when using the single calcite beam displacer 100, it is placed in the polarized collimated beam path before the focusing elements 28a and 28b. The narrow collimated beam after passing through the beam displacer 100 will separate into two orthogonally polarized collimated beams that are laterally displaced with respect to each other. After the beam displacer 100, the two parallel beams then pass through two separate focusing lenses 28a and 28b, and are focused to two separate points Sv and Sw. The separation distance between the two points is a function of the designed length of the calcite crystal 100. As mentioned above, the resulting beams of this configuration are generally free from astigmatism, and the beam displacer can be made smaller. However, two lenses are needed and they are required to be nearly identical, so as not to introduce different aberrations in the test and reference beams. Two spatial filter pinholes 137a and 137b would be used to spatially filter the beams, along with associated mechanisms for placement and adjustment of two pinholes in the focal plane of the focusing lens 28a and 28b.

Referring to FIG. 2E, dual calcite beam displacers 100a and 100b and a half waveplate 106 are used in the illustrated embodiment, which may be a preferred embodiment of the polarization beamsplitter element 38 of the present invention. This configuration or assembly is located after the focal plane of the focusing lens 28 and the pinhole 30. The second beam displacer 100b is selected to have the same (effective) length as the first beam displacer 100a, but with a rotation of 180° about its optical axis. The half-wave-plate 106, or other polarization rotation device, is placed between the two beam displacers 100a and 100b oriented with the fast axis at 45° with respect to both of the linearly polarized beams. With this orientation, the half waveplate 106 rotates the polarization directions of both incoming beams by 90°, thereby enabling the assembly to cancel out the astigmatism that would be present with either block 100a or 100b acting alone. It is further understood by one of ordinary skill in the art that the length of the calcite beam displacers 100a and 100b can be customized to control the spacing between virtual sources Sv and Sw that are produced.

The embodiment illustrated in FIG. 2F uses a polarizing cube beamsplitter 108 (or other device that separates the polarizations in a similar way), which splits the source beam 102 into two orthogonally polarized wavefronts V and W that are coupled into proximal ends of two polarization preserving optical fibers 112 and 114. The distal ends of the fibers 112 and 114, the outputs, are positioned proximately to each other, but with a spatial separation, in the focal plane of the collimator 44. Light leaves the outputs of the fibers 112 and 114 as mutually orthogonally polarized wavefronts V and W. Advantageously, the fibers 112 and 114 by their structure and configuration obviate the need for spatial filter pinholes and readily enable adjustment of the spatial separation between the sources Sv and Sw.

Referring to FIG. 2G, the illustrated embodiment has a polarization maintaining y-coupling fiber 120 to split the polarized source beam 102 into two wavefronts in fibers 122 and 124. One of the wavefronts (the wavefront traveling in the fiber 124 in the case of FIG. 2G) is then orthogonally polarized with respect to the other wavefront (the wavefront traveling in the fiber 122 in the case of FIG. 2G) by an inline polarization rotation device 126. The resulting orthogonally polarized wavefronts V and W are outputted from the y-coupling fiber 120.

Referring to FIG. 2H, the illustrated embodiment also has the polarization maintaining y-coupling fiber 120 to split the polarized source beam 102 into two wavefronts in the fibers 122 and 124. However, a half waveplate 130 or other similar or equivalent device is provided to rotate the polarization of the wavefront exiting the fiber 126 with respect to the wavefront exiting the fiber 122.

It is understood by one of ordinary skill in the art that for each of the fiber optic methods above of FIGS. 2G and 2H, the two fiber optics 122 and 126 may be configured to allow wavefronts V and W to be spaced adjacent (with a relative spatial displacement between Sv and Sw) and parallel as shown in FIG. 2F or adjacent and adjust angularly as shown in FIGS. 2G and 2H as desirable or appropriate. It is further understood by one of ordinary skill in the art that the system use any of the following to provide orthogonally polarized output wavefronts V and W: a polarization splitter based on photonic crystal fibers, a fiber optic Polarization Beam Splitter/Combiner with polarization maintaining fiber pigtails, or an integrated waveguide polarization splitter.

The embodiments illustrated in FIG. 2I and FIG. 2J represent two variations of a lateral displacement beamsplitter. The lateral displacement beamsplitter 140 placed after the pinhole 36 splits the incoming beam 102 into two orthogonal polarized beams V and W, originating from virtual sources Sv and Sw. The separation between the sources is defined by the geometrical size of the beamsplitter. The polarizing cube beamsplitter 141 with mirror 142 (FIG. 2J) is a variation of the lateral displacement beamsplitter 140. The two will have similar performance.

Figure 4:
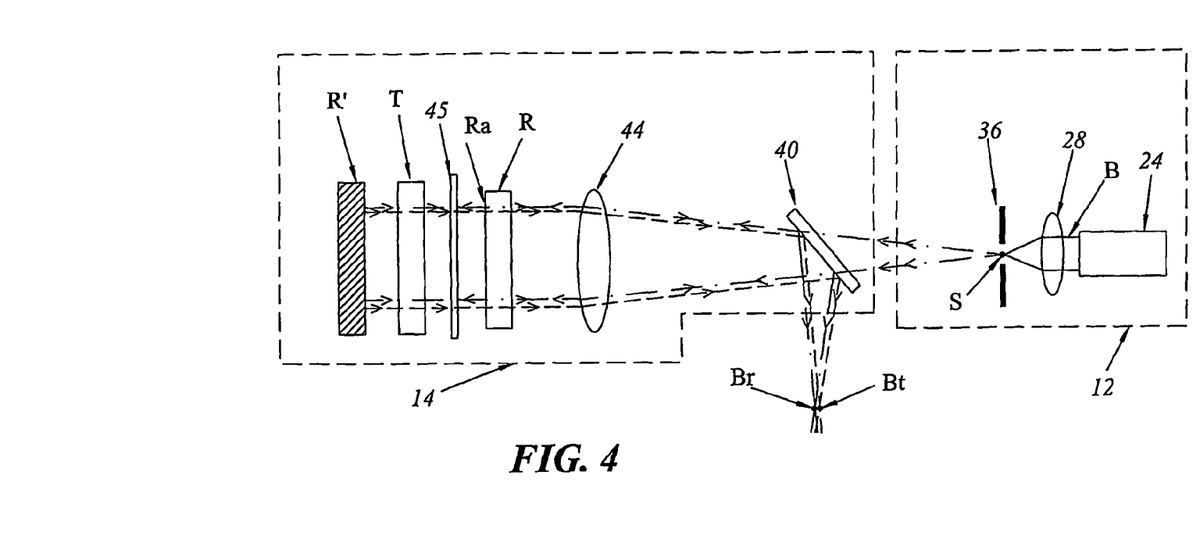
FIG. 4 is a plan view of another embodiment of the present invention using a quarter waveplate between a reference object and a test object.

Referring to FIG. 4, yet another alternative embodiment of the system 10 of the present invention is shown, having a quarter waveplate 45 in lieu of both the polarization beamsplitter element 38 and quarter waveplate 42 (although the system will still function with the quarter waveplate 42 in place). The optical path of the system 10 as substantially as that described in reference to the embodiment of FIG. 1, although the treatment and manipulation of the beam traveling the optical path differs from that of the embodiment of FIG. 1 However, despite these differences, the wavefronts that exit the interferometry module 14 of the embodiment of FIG. 4 are nevertheless mutually orthogonally polarized in accordance with the present invention.

In the embodiment of FIG. 4, the polarized source 24 generates the polarized beam of light (or wavefront) B that passes through the lens 28, which focuses the light through an aperture or pinhole 30 configured in a spatial filter 36. The wavefront B, as emanating from a single polarized source S, then enters the interferometry module 14 where it passes through the non-polarizing beamsplitter 40, the collimator 44, and counters the reference or known object R. There, a percentage of the wavefront B reflects off a surface Ra of the reference object R, while another percentage of the wavefront B travels toward the quarter waveplate 45. The percentage reflected off the surface Ra forms reference wavefront Br which (traveling to the right in FIG. 4) transmits back through the collimator 44 and reflects off the non-polarizing beamsplitter 40 to exit the interferometry module 14. As such, the reference wavefront Br now carries characteristics or information about the reference object R which were imparted to this wavefronts as it reflected off or otherwise interacted with the reference object.

The other percentage of the wavefront B that is transmitted completely through the reference object R continues to travel toward the quarter waveplate 45 where it is converted to circular polarization before reflecting off the test object T and forms test wavefront Bt (traveling to the right in FIG. 1). Then it again counters the quarter waveplate 45. It is understood by one of ordinary skill in the art that the quarter wave plate 45 could always be oriented in such a way that the beam Bt after passing through the quarter wave plate 45 will be orthogonally polarized with respect to the reference beam Br. The wavefront Bt then continues through the reference object R and the collimator 44 before reflecting off the non-polarizing beamsplitter 40 to exit the interferometry module 14.

The wavefronts Br and Bt now carry characteristics or information about the test object T which were imparted to these wavefronts as they reflected off or otherwise interacted with the test object T, and are mutually orthogonally polarized before entering the simultaneous phase shifting module 20 for processing to produce interferograms suitable. Again, it is understood by one of ordinary skill in the art that depending on the optical properties of the test object T, the other percentage incidental on the test object T can also can transmit through the test object T and reflect off a second reference object R' (to create Br', not shown). In the latter event, the wavefront Br' is treated by the system 10 in a fashion similar to that described herein for the wavefronts Vt and Wt.

It is understood by one of ordinary skill in the art that the interferometer described in the present invention can be used as a standard phase shifting Fizeau-type interferometer providing that a standard phase shifting mechanism is present. Additionally, because the system of the present invention produces and uses orthogonally polarized test and reference beams (which can be in the visible light spectrum or other regions of the electromagnetic spectrum with longer or shorter wavelengths), it is possible to use a variable phase retarder after the source 12 to induce phase shifts. This would normally alleviate the need in a standard Fizeau to phase shift by physically moving the reference element, which can be large for testing large optics.

Additionally, an important aspect of the present invention allows for a variable intensity ratio between reference and test beams by rotating the polarization of the source 24. This would normally allow for measurements of a variety of objects with different coefficients of reflection (or transmission) without the use of an attenuator. The polarization from the source 24 can be rotated by physically rotating the source, or by optically rotating the polarization of the source. Where the source is linearly polarized, the polarization can be rotated by inserting a half waveplate after the source 24 and adjusting its rotation. This would normally change the amount of intensity in the two orthogonally polarized beams W and V, making one brighter than the other. If the test object is relatively more reflective, then it would typically be advantageous to decrease the intensity delivered to the test object so the reflected beam's intensity is roughly equal to the beam reflected from the reference object. This produces fringes of higher contrast in the interferograms.

In yet another embodiment of the present invention (referring to FIG. 1.), the laser 24 is replaced by an appropriate multi-wavelength source, or multi-wavelength source assembly for dual wavelength interferometry. Examples of these types of sources include a source with a broad enough bandwidth such that select wavelengths can be filtered out for use (either simultaneously or temporally for individual simultaneous measurements at each wavelength), a tunable laser, at least two separate sources that are combined so that their beams are substantially coincident, and multiple sources coupled in to a fiber or fibers.

Optical components of interferometer front-end and back-end would be modified if necessary to provide achromatic properties. Phase-shifting module 20 would then be replaced with a phase-shifting module capable of processing multiple wavelengths for dual-wavelength interferometry. Among other applications, this would increase the dynamic range or height measuring capabilities of the invention, when measuring 3D profiles.

It is further understood by one of ordinary skill in the art that any simultaneous phase shifting apparatus that uses orthogonally polarized test and reference beams at its input, can be used in lieu of the module 20, to produce multiple interferograms.

It is also further understood by one of ordinary skill in the art that other types of interferometers, common path interferometers, and differential interferometers, can be adapted in a similar way (as the classical Fizeau-type was here), to be converted to a simultaneous phase shifting configuration.

It is understood by one of ordinary skill in the art that the scope of the invention is not limited to the embodiments described above. Many other modifications and variations will be apparent to those of ordinary skill in the art, and it is therefore, to be understood that within the scope of the appended claims the invention may be practiced otherwise than as specifically described.

What is claimed is:

1. An interferometric system, comprising:
   a reference object;
   a test object;
   at least a first and a second mutually orthogonally polarized beam of light, the first beam interacting with a series of optical components including a reference object and a test object along a first path and the second beam interacting with the series of optical components along a second path wherein the first path-is spatially displaced from the second path at each component of the series of optical components, wherein the reference object has a surface curvature that focuses the first and the second beams back along a same path travelled by the beams entering the test object;
   a simultaneous phase shifting module that receives at least a portion of the first and second beams after the first and second beams have interacted with said reference object and said test object; and
   at least two phase-shifted interferograms generated substantially simultaneously from the portion of the first and second beams received at the simultaneous phase shifting module.

2. An interferometric system of claim 1, wherein said portion of said beams comprises mutually orthogonally polarized reference and test beams.

3. An interferometric system of claim 2, wherein said reference beam emanates from one of said spatially separated sources and said test beam emanates from another of said spatially separated sources.

4. An interferometric system of claim 2, wherein said reference and test beams received by said simultaneous phase shifting module substantially overlap each other.

5. An interferometric system of claim 1, wherein the mutually orthogonally polarized beams are coherent.

6. An interferometric system of claim 1, further comprising two spatially separated sources.

7. An interferometric system of claim 6, wherein the at least two spatially separated light sources are comprised of a linearly polarized light source and a polarization beamsplitter configured to split linearly polarized light into said two mutually orthogonally polarized beams.

8. An interferometric system of claim 6, wherein said sources are virtual.

9. An interferometric system of claim 6, wherein said sources are real.

10. An interferometric system of claim 6, wherein the at least two spatially separated light sources are comprised of a polarization beamsplitter configured to interact with a beam from a source to provide said mutually orthogonally polarized beams.

11. An interferometric system of claim 10, wherein said polarization beamsplitter comprises a prism.

12. An interferometric system of claim 10, wherein said polarization beamsplitter comprises a calcite beam displacer.

13. An interferometric system of claim 10, wherein said polarization beamsplitter comprises two calcite beam displacers and a half waveplate.

14. An interferometric system of claim 10, wherein the polarization beamsplitter comprises two fiber optics and a cube polarizing beamsplitter.

15. An interferometric system of claim 10, wherein the polarization beamsplitter comprises a polarizing lateral displacement beamsplitter.

16. An interferometric system of claim 10, wherein the polarization beamsplitter comprises a cube polarizing beamsplitter and mirror.

17. An interferometric system of claim 6, wherein at least one of said sources is virtual.

18. An interferometric system of claim 1, further comprising an alignment module.

19. An interferometric system of claim 18, wherein the alignment module is positioned to intercept the beams between the test object and the simultaneous phase-shifting module.

20. An interferometric system of claim 1, further comprising an imaging module.

21. An interferometric system of claim 20, wherein the imaging module is positioned to intercept the beams between the test object and the simultaneous phase shifting module.

22. An interferometric system of claim 3, wherein a non-polarizing beamsplitter is positioned substantially between the light sources and the reference object.

23. An interferometric system of claim 1, further comprising a quarter waveplate positioned between the light sources and the reference object.

24. An interferometric system of claim 23, wherein the quarter waveplate is positioned substantially between a non-polarizing beamsplitter and a collimator.

25. An interferometric system of claim 1, wherein the interferometric system is of a Fizeau configuration.

26. An interferometric system of claim 1, further comprising a filter to block said other portion of the beams from entering the simultaneous phase shifting module.

27. An interferometric system of claim 26, wherein said filter is configured with an aperture to permit passage of said portion of the beams received by the simultaneous phase shifting module.

28. An interferometric system of claim 1, further comprising a variable phase retarder inserted between said light sources and said reference object.

29. An interferometric system of claim 1, wherein said beams follow a substantially common path through said interferometric system.

30. An interferometric system of claim 1, wherein the first path is substantially common to the second path in a location between the reference object and the test object.

31. An interferometric system of claim 1, further comprising at least one beam-reference object interaction location for each of the first beam and the second beam, wherein the beam-reference object interaction location for the first beam is substantially common with the beam-reference object interaction location for the second beam, and wherein the beam-reference object interaction location for the first beam is spatially displaced from the beam-reference object interaction location for the second beam at least a first beam.

32. An interferometric system of claim 1, wherein the first path is spatially displaced from the second path along an entire distance between a non-polarizing beamsplitter and the reference object.

33. An interferometric system of claim 1, wherein the reference object is located substantially between the test object and a non-polarizing beamsplitter.

34. An interferometric system, comprising:
a reference object;
a test object;
a source of polarized light and a polarization beamsplitter;
at least a first and a second mutually orthogonally polarized beam of light, the first beam interacting with a series of optical components including a reference object and a test object along a first path and the second beam interacting with the series of optical components along a second path, and wherein the first path is spatially displaced from the second path at each component of the series of optical components, wherein the reference object has a surface curvature that focuses the first and the second beams back along a same path travelled by the beams entering the object;
means for overlapping a test beam and a reference beam;
a phase shifting module that receives at least a portion of the first and second beams after the first and second beams have interacted with the reference object and the test object; and
at least two phase-shifted interferograms generated substantially simultaneously from the portion of the first and second test and reference beams received at the phase shifting module.

35. An interferometric system of claim 34, wherein said polarized light from said source is linearly polarized.

36. An interferometric system of claim 34, further comprising means for viewing said test and reference beams.

37. An interferometric system of claim 34, further comprising means for selecting said test and reference beams.

38. An interferometric system, comprising:
a reference object;
a test object;
a source of linearly polarized light, and a polarization beamsplitter;
at least a first and a second mutually orthogonally polarized wavefront, the first beam interacting with a series of optical components including a reference object and a test object along a first path and the second beam interacting with the series of optical components along a second path, and wherein the first path is spatially displaced from the second path at each component of the series of optical components, wherein the reference object has a surface curvature that focuses the first and the second beams back along a same path travelled by the beams entering the test object;
at least one orthogonally polarized reference wavefront and at least one orthogonally polarized test wavefront is reflected from said reference object and said test object, respectively;
means for overlapping one of said at least one orthogonally polarized reference wavefront with one of said at least one orthogonally polarized test wavefronts; and a simultaneous phase shifting module that receives said overlapping at least one reference wavefront and said at least one test wavefront;

at least two phase-shifted interferograms generated substantially simultaneously at the simultaneous phase shifting module from the received overlapping at least one reference wavefront and the at least one test wavefront.

39. An interferometric system comprising:

a Fizeau interferometer comprising a source of a first and a second polarized beam each having polarization rotated with respect to each other and each emanating from spatially separate origins, the first beam interacting with a series of optical components including a reference object and a test object along a first path and the second beam interacting with the series of optical components along a second path, wherein the first path is spatially displaced from the second path at each component of the series of optical components, and wherein the reference object has a surface curvature that focuses the first and the second beams back along a same path travelled by the beams entering the test object.

* * * * *